(12) United States Patent
Ho et al.

(10) Patent No.: US 11,562,179 B2
(45) Date of Patent: *Jan. 24, 2023

(54) ARTIFICIAL INTELLIGENCE SYSTEM FOR INSPECTING IMAGE RELIABILITY

(71) Applicant: CAPITAL ONE SERVICES, LLC, McLean, VA (US)

(72) Inventors: Chi-San Ho, Allen, TX (US); Sunil Subrahmanyam Vasisht, Frisco, TX (US); Micah Price, Plano, TX (US); Aamer Charania, Flower Mound, TX (US)

(73) Assignee: Capital One Services, LLC, McLean, VA (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/031,176

(22) Filed: Sep. 24, 2020

(65) Prior Publication Data

US 2021/0049416 A1     Feb. 18, 2021

Related U.S. Application Data

(63) Continuation of application No. 16/209,414, filed on Dec. 4, 2018, now Pat. No. 10,824,915.

(51) Int. Cl.
*G06K 9/62* (2022.01)

(52) U.S. Cl.
CPC ........... *G06K 9/6262* (2013.01); *G06K 9/623* (2013.01); *G06K 9/628* (2013.01); *G06K 9/6284* (2013.01); *G06K 2209/23* (2013.01)

(58) Field of Classification Search
CPC ...... G06K 9/6262; G06K 9/623; G06K 9/628; G06K 9/6284; G06K 2209/23
See application file for complete search history.

(56) References Cited

U.S. PATENT DOCUMENTS 10,185,892 B1   1/2019  Mishra et al.
10,402,691 B1 * 9/2019  Abdi Taghi Abad .......................
                                                        G06K 9/6262
(Continued)

OTHER PUBLICATIONS

Cho Kuk—Pedestrian and car detection and classification for unmanned ground vehicle using 3D lidar and monocular camera (Year : 2011).*

*Primary Examiner* — Nizar N Sivji
(74) *Attorney, Agent, or Firm* — Finnegan, Henderson, Farabow, Garrett & Dunner, LLP

(57) ABSTRACT

A system for inspecting the reliability of an image. The system may include a processor in communication with a client device; and a storage medium. The storage medium may store instructions that, when executed, configure the processor to perform operations including: obtaining a plurality of images; categorizing the images into a plurality of image classes; calculating a plurality of probability outcomes; determining whether highest predicted probabilities of the images are less than a first threshold and whether an entropy of a predicted density of the probability outcomes exceeds a second threshold; indicating whether the image is associated with the image classes; ranking, the image amongst the plurality of images; filtering, a plurality of low reliability images according to a third threshold; providing, a likelihood of whether a user scanned a vehicle object associated with the image; and identifying a percentage of user scan failures.

20 Claims, 12 Drawing Sheets

(56) References Cited

U.S. PATENT DOCUMENTS

| | | | |
|---|---|---|---|
| 2008/0103996 A1* | 5/2008 | Forman | G06N 20/00 |
| | | | 706/12 |
| 2013/0216094 A1* | 8/2013 | DeLean | G06K 9/00335 |
| | | | 382/103 |
| 2014/0247972 A1* | 9/2014 | Wang | G06K 9/00147 |
| | | | 382/133 |
| 2016/0358336 A1* | 12/2016 | Franz | G06T 7/35 |
| 2017/0140237 A1* | 5/2017 | Voeller | G06K 9/3258 |
| 2019/0318405 A1* | 10/2019 | Hu | G06F 16/55 |

\* cited by examiner

ARTIFICIAL INTELLIGENCE SYSTEM FOR INSPECTING IMAGE RELIABILITY

CROSS-REFERENCE TO RELATED APPLICATIONS

This application is a continuation of U.S. patent application Ser. No. 16/209,414, filed on Dec. 4, 2018, which issued on Nov. 3, 2020 as U.S. Pat. No. 10,824,915, the disclosure of which is expressly incorporated herein by reference in its entirety.

TECHNICAL FIELD

The present disclosure relates generally to a machine-learning artificial intelligence system for analyzing the reliability of images or the likelihood of an image being inaccurate, and more particularly, to an artificial intelligence system that categorizes images of vehicles, determines probability outcomes based on vehicle attributes, and ranks the reliability of images.

BACKGROUND

Vehicle detection algorithms using computer-implemented image analysis are used in accordance with different approaches. For example, in some approaches, image sensors capture a plurality of image frames as part of a video sequence, and a system may analyze the captured image frames to provide vehicle detection. One or more classifiers may then be applied and a confidence score may be calculated in order to identify a vehicle in a captured vehicle image.

In other approaches, vehicles may be identified in accordance with horizontal and vertical edge detection, and vehicle categorization schemes may be presented to distinguish between types of vehicle (e.g. cars, SUVs, hybrids, and trucks) based on dimensional ratios. In some approaches, existing vehicle detection algorithms may focus exclusively on identifying a vehicle class and a non-vehicle class based on a variation of vehicle attributes, characteristics, or templates within training modules.

In other approaches, highly accurate vehicle identification based on only vehicle characteristics is possible with techniques based on machine-learning algorithms such as convolutional neural networks. These algorithms capture characteristics from images of known vehicles and then identify an unknown vehicle in an image by correlating image characteristics. Although these techniques may be computer-intensive, they can improve identification accuracy and facilitate the automation of a vehicle image identification system.

While the proliferation of automated vehicle detection algorithms based on image analysis has improved vehicle recognition, there remains a need for removing captured vehicle images that are mislabeled or inaccurate. Indeed, the accuracy and performance of many vehicle detection algorithms may be limited based upon mislabeled or inaccurate images in a training image set. For example, some captured images may include vehicle advertisements, toys, or related vehicle indicia that do not accurately constitute an actual vehicle, thereby limiting a vehicle detection algorithm's ability to accurately and precisely detect vehicles in other images. Thus, an improved method for finding mislabeled images, ranking the reliability of a captured image (that is, the likelihood of an image being inaccurate), and purging outlier images is required.

Moreover, identification of vehicles using handheld devices is also desirable to exploit handheld device capabilities and develop new applications. However, identification of vehicles using image analysis in handheld devices has multiple technical challenges. First, the machine-learning methods that provide enough precision for image analysis are computer-intensive and may be difficult to perform in a handheld device. These methods normally require the analysis of a plethora of well-curated training images before an identification process may be performed. Second, portable image identification of images needs to be performed quickly to be user-friendly. Particularly for augmented reality applications, in which users are expecting an immediate response, it is imperative to have efficient computing identification methods and communication systems that facilitate image recognition. Third, images or video feeds taken with a mobile device may not be uniform and may have different qualities and/or formats. Because image analysis using machine-learning methods is heavily dependent on the content relevance of a captured target image, the accuracy rate of these methods on images taken with mobile devices may be confounded by the content relevance of these captured images. Fourth, handheld devices have limited display screen space. Applications that require both image acquisition and display of information in a single screen, such as augmented reality applications, require specific graphical user interfaces so the user can comfortably see and manipulate the information.

The disclosed machine-learning artificial intelligence system and analytical inspection methods address one or more of the problems set forth above and/or other problems in the prior art.

SUMMARY

One aspect of the present disclosure is directed to a system for inspecting the reliability of an image or the likelihood of an image being inaccurate. The system may include at least one processor in communication with a client device; and at least one storage medium storing instructions that, when executed, configure the processor to perform operations. The operations may include obtaining a plurality of images; categorizing the images into a plurality of image classes, the image classes being associated with an image characteristic; calculating a plurality of probability outcomes, the probability outcomes being associated with the image classes; determining, based on the probability outcomes whether highest predicted probabilities of the images are less than a first threshold and whether an entropy of a predicted density of the probability outcomes exceeds a second threshold; indicating, based on the determination, whether the image is associated with the image classes, the association being determined by at least the reliability of an image; ranking, based on the indication, the image amongst the plurality of images, the ordering of the ranking being reflective of the reliability of the image; filtering, based on the ranking, a plurality of low reliability images according to a third threshold, the filtering including removing at least one of the low reliability images; providing, based on the image classes, a likelihood of whether a user scanned a vehicle object associated with the image; and identifying a percentage of user scan failures due to user misuse in accordance with whether or not the user is scanning a vehicle image.

Another aspect of the present disclosure is directed to a non-transitory computer-readable medium storing instructions that, when executed by a processor, cause the processor to operate a computer system for inspecting the reliability of an image by performing operations. The operations may include obtaining a plurality of images; categorizing the images into a plurality of image classes, the image classes being associated with an image characteristic; calculating a plurality of probability outcomes, the probability outcomes being associated with the image classes; determining, based on the probability outcomes whether highest predicted probabilities of the images are less than a first threshold and whether an entropy of a predicted density of the probability outcomes exceeds a second threshold; indicating, based on the determination, whether the image is associated with the image classes, the association being determined by at least the reliability of an image; ranking, based on the indication, the image amongst the plurality of images, the ordering of the ranking being reflective of a reliability of the image; filtering, based on the ranking, a plurality of low reliability images according to a third threshold, the filtering including removing at least one of the low reliability images; providing, based on the image classes, a likelihood of whether a user scanned a vehicle object associated with the image; and identifying a percentage of user scan failures due to user misuse in accordance with whether or not the user is scanning a vehicle image.

Yet another aspect of the present disclosure is directed to a computer-implemented method for inspecting the reliability of an image. The method may include obtaining a plurality of images; categorizing the images into a plurality of image classes, the image classes being associated with an image characteristic; calculating a plurality of probability outcomes, the probability outcomes being associated with the image classes; determining, based on the probability outcomes whether highest predicted probabilities of the images are less than a first threshold and whether an entropy of a predicted density of the probability outcomes exceeds a second threshold; indicating, based on the determination, whether the image is associated with the image classes, the association being determined by at least the reliability of an image; ranking, based on the indication, the image amongst the plurality of images, the ordering of the ranking being reflective of the reliability of the image; filtering, based on the ranking, a plurality of low reliability images according to a third threshold, the filtering including removing at least one of the low reliability images; providing, based on the image classes, a likelihood of whether a user scanned a vehicle object associated with the image; and identifying a percentage of user scan failures due to user misuse in accordance with whether or not the user is scanning a vehicle image.

Another aspect of the present disclosure is directed to a system for inspecting the reliability of an image. The system may include at least one processor in communication with a client device operated by a user; and at least one storage medium storing instructions that, when executed, configure the processor to perform operations. The operations may include receiving, from the client device, a client image of an object; generating a probability threshold that defines a likelihood that the received client image includes a vehicle; calculating, using a prediction function, a probability indicative of the likelihood that the received client image includes a vehicle; determining, based on a comparison of the calculated probability to the probability threshold, whether the image includes a vehicle; categorizing, based on the determination, the image into at least one of a first group, a second group, or a third group, the groups representing first, second, and third confidence levels; communicating, when the image is categorized in the first group, first information that indicates the image includes a vehicle, and when the image is categorized in the second group, second information that the image does not include a vehicle; providing, when the image is categorized in the second group, a recommendation to the user not to capture the same image; and concealing, when the image is categorized in the third group, third information associated with the image.

A further aspect of the present disclosure is directed to a non-transitory computer-readable medium storing instructions that, when executed by a processor, cause the processor to operate a computer system for inspecting the reliability of an image by performing operations. The operations may include receiving, from a client device, a client image of an object; generating a probability threshold that defines a likelihood that the received client image includes a vehicle; calculating, using a prediction function, a probability indicative of the likelihood that the received client image includes a vehicle; determining, based on a comparison of the calculated probability to the probability threshold, whether the image includes a vehicle; categorizing, based on the determination, the image into at least one of a first group, a second group, or a third group, the groups representing first, second, and third confidence levels; communicating, when the image is categorized in the first group, first information that indicates the image includes a vehicle, and when the image is categorized in the second group, second information that the image does not include a vehicle; providing, when the image is categorized in the second group, a recommendation to the user not to capture the same image; and concealing, when the image is categorized in the third group, third information associated with the image.

Yet another aspect of the present disclosure is directed to a computer-implemented method for inspecting the reliability of an image. The method may include receiving, from a client device, a client image of an object; generating a probability threshold that defines a likelihood that the received client image includes a vehicle; calculating, using a prediction function, a probability indicative of the likelihood that the received client image includes a vehicle; determining, based on a comparison of the calculated probability to the probability threshold, whether the image includes a vehicle; categorizing, based on the determination, the image into at least one of a first group, a second group, or a third group, the groups representing first, second, and third confidence levels; communicating, when the image is categorized in the first group, first information that indicates the image includes a vehicle, and when the image is categorized in the second group, second information that the image does not include a vehicle; providing, when the image is categorized in the second group, a recommendation to the user not to capture the same image; and concealing, when the image is categorized in the third group, third information associated with the image.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

The disclosure is generally directed to a machine-learning artificial intelligence system for inspecting image reliability or the likelihood of an image being inaccurate and communicating vehicle information to a client device. In some embodiments, the vehicle information may be communicated by superimposing images on graphical user interfaces displayed on a handheld device. To overcome the lack of uniformity between images received for identification, training data sets are used by the identification system, and may include images that are classified among image classes to reconcile variations from images taken with mobile devices. Further, the identification system may be automatically updated as new images become available and vehicle information changes. The identification system may re-calculate the classification, and may remove images based upon a ranking of image reliability or the likelihood of an image being inaccurate. The system additionally may generate graphical user interfaces (GUI) displaying identified information and may generate augmented reality GUIs. In some embodiments, the system may comprise specialized software to efficiently conduct filtering, sorting, and parallel calculation tasks that improve computing time and enable real-time applications such as augmented reality.

Reference will now be made in detail to the disclosed embodiments, examples of which are illustrated in the accompanying drawings.

Figure 1:
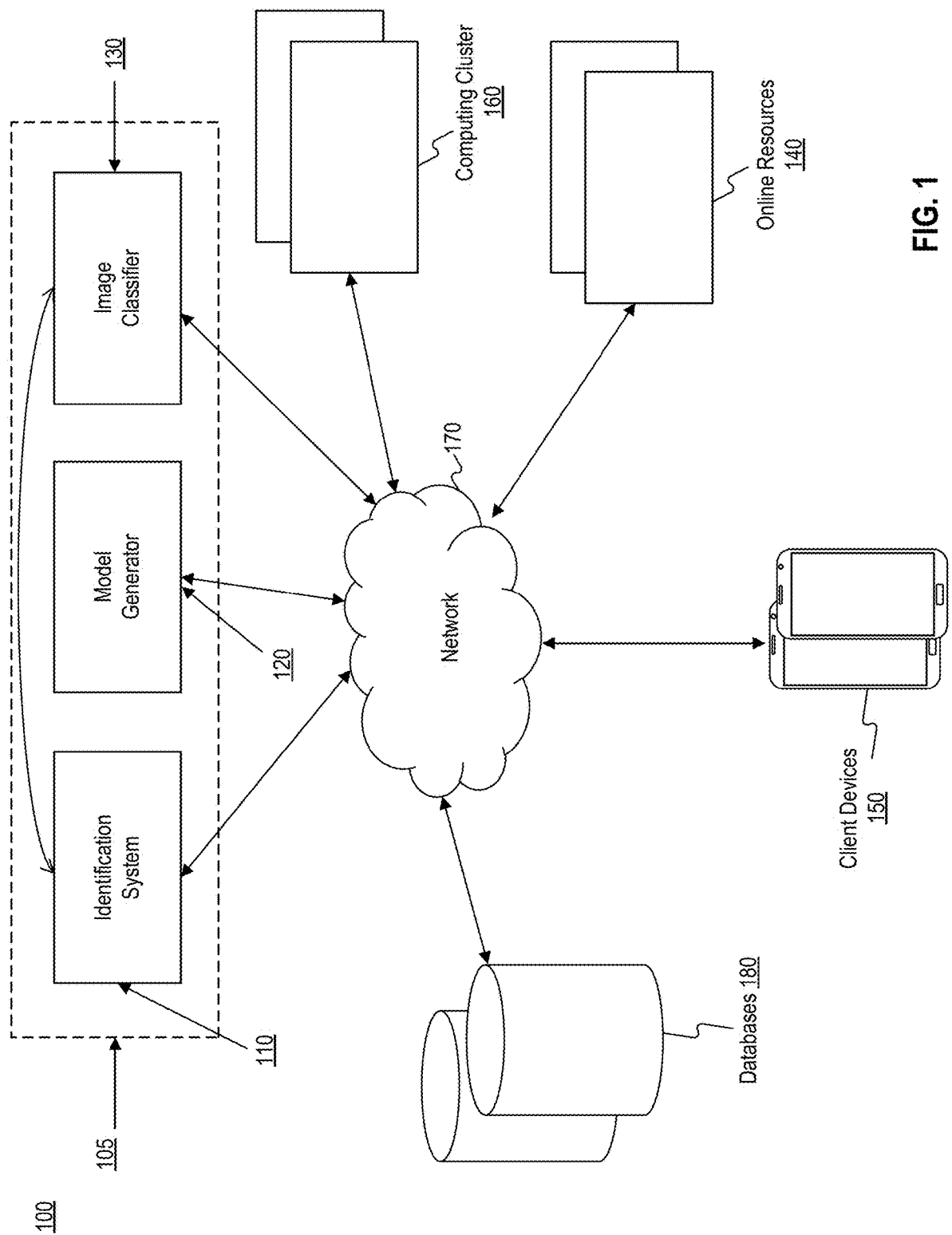
FIG. 1 is a block diagram of an exemplary image inspection system, consistent with disclosed embodiments.

FIG. 1 is a block diagram of an exemplary image inspection system 100, consistent with disclosed embodiments. System 100 may be used to identify a vehicle and associated attributes based on an image of the vehicle, consistent with disclosed embodiments. System 100 may include an identification system 105 which may include an image recognizer 110, a model generator 120, and an image classifier 130. System 100 may additionally include online resources 140, one or more client devices 150, one or more computing clusters 160, and one or more databases 180. In some embodiments, as shown in FIG. 1, components of system 100 may be connected to a network 170. However, in other embodiments components of system 100 may be connected directly with each other, without network 170.

Online resources 140 may include one or more servers or storage services provided by an entity such as a provider of website hosting, networking, cloud, or backup services. In some embodiments, online resources 140 may be associated with hosting services or servers that store web pages for car manufacturers and/or car dealers. In other embodiments, online resources 140 may be associated with a cloud computing service such as Microsoft Azure™ or Amazon Web Services™. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as image compression, notification of identified vehicles alerts, and/or completion messages and notifications.

Client devices 150 may include one or more computing devices configured to perform one or more operations consistent with disclosed embodiments. For example, client devices 150 may include desktop computers, laptops, servers, mobile devices (e.g., tablet, smart phone, etc.), gaming devices, wearable computing device, or other types of computing devices. Client devices 150 may include one or more processors configured to execute software instructions stored in memory, such as memory included in client devices 150, to perform operations to implement the functions described below. Client devices 150 may include software that when executed by a processor performs known Internet-related communication and content display processes. For instance, client devices 150 may execute browser software that generates and displays interfaces including content on a display device included in, or connected to, client devices 150. Client devices 150 may execute applications that allows client devices 150 to communicate with components over network 170, and generate and display content in interfaces via display devices included in client devices 150. The display devices may be configured to display images shown in FIG. 10 and other vehicle images.

The disclosed embodiments are not limited to any particular configuration of client devices 150. For instance, a client device 150 may be a mobile device that stores and executes mobile applications to perform operations that provide functions offered by identification system 105 and/or online resources 140, such as providing information about vehicles in a database 180. In certain embodiments, client devices 150 may be configured to execute software instructions relating to location services, such as GPS locations. For example, client devices 150 may be configured to determine a geographic location and provide location data and time stamp data corresponding to the location data. In yet other embodiments, client devices 150 may employ cameras 620 to capture video and/or images.

Computing clusters 160 may include a plurality of computing devices in communication. For example, in some embodiments, computing clusters 160 may be a group of processors in communication through fast local area networks. In other embodiments computing clusters 160 may be an array of graphical processing units configured to work in parallel as a GPU cluster. In such embodiments, computer cluster may include heterogeneous or homogeneous hardware. In some embodiments, computing clusters 160 may include a GPU driver for the each type of GPU present in each cluster node, a Clustering API (such as the Message Passing Interface, MPI), and VirtualCL (VCL) cluster platform such as a wrapper for OpenCL™ that allows most unmodified applications to transparently utilize multiple OpenCL devices in a cluster. In yet other embodiments, computing clusters 160 may operate with distcc (a program to distribute builds of C, C++, Objective C or Objective C++ code across several machines on a network to speed up building), and MPICH (a standard for message-passing for distributed-memory applications used in parallel computing), Linux Virtual Server™ LinuxHA™, or other director-based clusters that allow incoming requests for services to be distributed across multiple cluster nodes.

Databases 180 may include one or more computing devices configured with appropriate software to perform operations consistent with providing identification system 105, model generator 120, and image classifier 130 with data associated with vehicle images, vehicle characteristics, and stored information about vehicle sales, such as cost or condition. Databases 180 may include, for example, Oracle™ databases, Sybase™ databases, or other relational databases or non-relational databases, such as Hadoop™ sequence files, HBase™, or Cassandra™. Database(s) 180 may include computing components (e.g., database management system, database server, etc.) configured to receive and process requests for data stored in memory devices of the database(s) and to provide data from the database(s).

While databases 180 are shown separately, in some embodiments databases 180 may be included in or otherwise related to one or more of identification system 105, image recognizer 110, model generator 120, image classifier 130, and online resources 140.

Databases 180 may be configured to collect and/or maintain the data associated with vehicles being displayed in online resources 140 and provide it to the identification system 105, model generator 120, image classifier 130, and client devices 150. Databases 180 may collect the data from a variety of sources, including, for instance, online resources 140. Databases 180 are further described below in connection with FIG. 5.

Image classifier 130 may include one or more computing systems that collect images and process them to create training data sets that can be used to develop the identification model. For example, image classifier 130 may include an image collector 410 (FIG. 4) that collects images that are then used for training a logistic regression model, convolutional neural network, or other supervised machine learning classification techniques. In some embodiments, image classifier 130 may be in communication with online resources 140 and detect changes in the online resources 140 to collect images and begin the classification process.

Model generator 120 may include one or more computing systems configured to generate models to identify a vehicle using a vehicle image. Model generator 120 may receive or obtain information from databases 180, computing clusters 160, online resources 140, and image classifier 130. For example, model generator 120 may receive a plurality of images from databases 180 and online resources 140. Model generator 120 may also receive images and metadata from image classifier 130.

In some embodiments, model generator 120 may receive requests from image recognizer 110. As a response to the request, model generator 120 may generate one or more identification models. Identification models may include statistical algorithms that are used to determine the likeliness between images given a set of training images. For example, identification models may be convolutional neural networks that determine attributes in a figure based on extracted parameters. However, identification models may also include regression models that estimate the relationships among input and output variables. Identification models may additionally sort elements of a dataset using one or more classifiers to determine the probability of a specific outcome. Identification models may be parametric, non-parametric, and/or semi-parametric models.

In some embodiments, identification models may represent an input layer and an output layer connected via nodes with different activation functions as in a convolutional neural network. "Layers" in the neural network may transform an input variable into an output variable (e.g., holding class scores) through a differentiable function. The convolutional neural network may include multiple distinct types of layers. For example, the network may include a convolution layer, a pooling layer, a ReLU Layer, a number of filter layers, a filter shape layer, and/or a loss layer. Further, the convolution neural network may comprise a plurality of nodes. Each node may be associated with an activation function and each node maybe connected with other nodes via synapsis that are associated with a weight.

The neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Identification models may also include Random Forests, composed of a combination of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Identification models may additionally or alternatively include classification and regression trees, or other types of models known to those skilled in the art. Model generator 120 may submit models to identify a vehicle. To generate identification models, model generator 120 may analyze images that are classified by the image classifier 130 applying machine-learning methods. Model generator 120 is further described below in connection with FIG. 3.

Image recognizer 110 may include one or more computing systems configured to perform operations consistent with identifying vehicle images. In some embodiments, Image recognizer 110 may receive a request to identify an image. Image recognizer 110 may receive the request directly from client devices 150. Alternatively, image recognizer 110 may receive the request from other components of system 100. For example, client devices 150 may send requests to online resources 140, which then sends requests to identification system 105. The request may include an image of a vehicle and a location of client devices 150. Additionally, in some embodiments the request may specify a date and preferences. In other embodiments, the request may include a video file or a streaming video feed.

As a response to identification requests, identification system 105 may initiate identification models using model generator 120. The request may include information about the image source, for example an identification of client device 150. The request may additionally specify a location. In addition, image recognizer 110 may retrieve information from databases 180. In other embodiments, identification system 105 may handle identification requests with image recognizer 110 and retrieve a previously developed model by model generator 120.

Image recognizer 110 may generate an identification result based on the information received from the client device request and transmit the information to the client device. Image recognizer 110 may generate instructions to modify a graphical user interface to include identification information associated with the received image. Image recognizer 110 is further described below in connection with FIG. 2.

FIG. 1 shows image recognizer 110, model generator 120, and image classifier 130 as different components. However, image recognizer 110, model generator 120, and image classifier 130 may be implemented in the same computing system. For example, all elements in identification system 105 may be embodied in a single server.

Network 170 may be any type of network configured to provide communications between components of system 100. For example, network 170 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
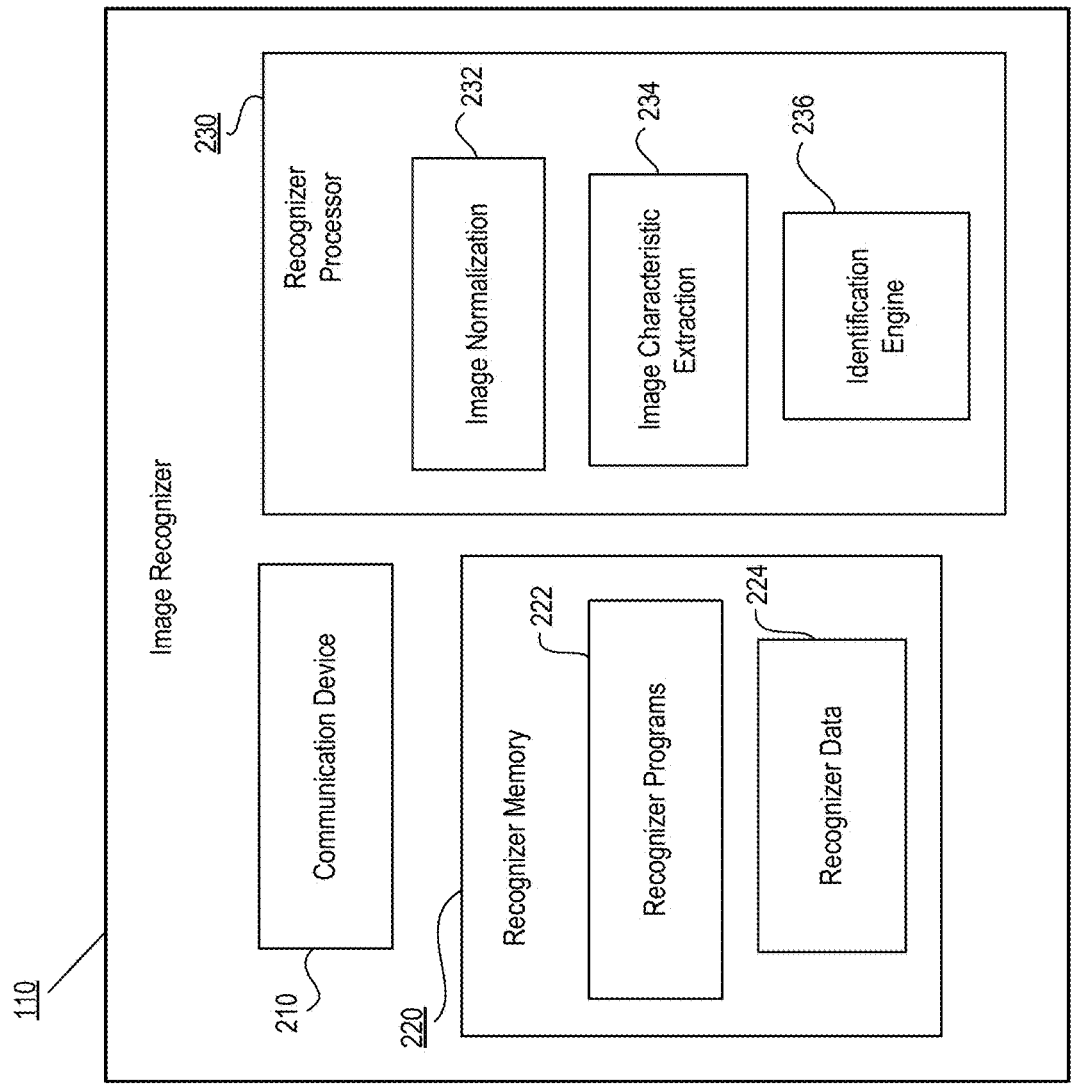
FIG. 2 is a block diagram of an exemplary image recognizer, consistent with disclosed embodiments.

FIG. 2 shows a block diagram of an exemplary image recognizer 110, consistent with disclosed embodiments. Image recognizer 110 may include a communication device 210, a recognizer memory 220, and one or more recognizer processors 230. Recognizer memory 220 may include recognizer programs 222 and recognizer data 224. Recognizer processor 230 may include an image normalization module 232, an image characteristic extraction module 234, and an identification engine 236.

In some embodiments, image recognizer 110 may take the form of a server, a general purpose computer, a mainframe computer, or any combination of these components. In other embodiments, image recognizer 110 may be a virtual machine. Other implementations consistent with disclosed embodiments are possible as well.

Communication device 210 may be configured to communicate with one or more databases, such as databases 180 described above, either directly, or via network 170. In particular, communication device 210 may be configured to receive from model generator 120 a model to identify vehicle attributes in an image and client images from client devices 150. In addition, communication device 210 may be configured to communicate with other components as well, including, for example, databases 180 and image classifier 130.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Recognizer memory 220 may include one or more storage devices configured to store instructions used by recognizer processor 230 to perform functions related to disclosed embodiments. For example, recognizer memory 220 may store software instructions, such as recognizer program 222, that may perform operations when executed by recognizer processor 230. The disclosed embodiments are not limited to separate programs or computers configured to perform dedicated tasks. For example, recognizer memory 220 may include a single recognizer program 222 that performs the functions of image recognizer 110, or recognizer program 222 may comprise multiple programs. Recognizer memory 220 may also store recognizer data 224 that is used by recognizer program(s) 222.

In certain embodiments, recognizer memory 220 may store sets of instructions for carrying out processes to identify a vehicle from an image, generate a list of identified attributes, and/or generate instructions to display a modified graphical user interface. In certain embodiments, recognizer memory 220 may store sets of instructions for identifying whether an image is acceptable for processing and generate instructions to guide the user in taking an acceptable image. Other instructions are possible as well. In general, instructions may be executed by recognizer processor 230 to perform operations consistent with disclosed embodiments.

In some embodiments, recognizer processor 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, recognizer processor 230 may be a plurality of devices coupled and configured to perform functions consistent with the disclosure.

In some embodiments, recognizer processor 230 may execute software to perform functions associated with each component of recognizer processor 230. In other embodiments, each component of recognizer processor 230 may be an independent device. In such embodiments, each component may be a hardware device configured to specifically process data or perform operations associated with modeling hours of operation, generating identification models and/or handling large data sets. For example, image normalization module 232 may be a field-programmable gate array (FPGA), image characteristic extraction module 234 may be a graphics processing unit (GPU), and identification engine 236 may be a central processing unit (CPU). Other hardware combinations are also possible. In yet other embodiments, combinations of hardware and software may be used to implement recognizer processor 230.

Image normalization module 232 may normalize a received image so it can be identified in the model. For example, communication device 210 may receive an image from client devices 150 to be identified. The image may be in a format that cannot be processed by image recognizer 110 because it is in an incompatible format or may have parameters that cannot be processed. For example, the received image may be received in a specific format such as High Efficiency Image File Format (HEIC) or in a vector image format such as Computer Graphic Metafile (CGM). Then, image normalization module 232 may convert the received image to a standard format such as JPEG or TIFF. Alternatively or additionally, the received image may have an aspect ratio that is incompatible with an identification model. For example, the image may have a 2.39:1 ratio which may be incompatible with the identification model. Then, image normalization module 232 may convert the received image to a standard aspect ratio such as 4:3. In some embodiments, the normalization may be guided by a model image. For example, a model image stored in recognizer data 224 may be used to guide the transformations of the received image.

In some embodiments, recognizer processor 230 may implement image normalization module 232 by executing instructions of an application in which images are received and transformed. In other embodiments, however, image normalization module 232 may be a separate hardware device or group of devices configured to carry out image operations. For example, to improve performance and speed of the image transformations, image normalization module 232 may be an SRAM-based FPGA that functions as image normalization module 232. Image normalization module 232 may have an architecture designed for implementation of specific algorithms. For example, image normalization module 232 may include a Simple Risc Computer (SRC) architecture or other reconfigurable computing system.

Image characteristic extraction module 234 may extract characteristics from a received image or a normalized image. In some embodiments, characteristics may be extracted from an image by applying a pre-trained convolutional neural network. For example, in some embodiments pre-trained networks such as Inception-v3 or AlexNet may be used to automatically extract characteristics from a target image. In such embodiments, characteristic extraction module 234 may import layers of a pre-trained convolutional network, determine characteristics described in a target layer of the pre-trained convolutional network, and initialize a multi-class fitting model using the characteristics in the target layer and images received for extraction.

In other embodiments, deep learning models such as Fast R-CNN can be used for automatic characteristic extraction. In yet other embodiments, processes such as histogram of oriented gradients (HOG), speeded-up robust characteristics (SURF), local binary patterns (LBP), color histogram, or Haar wavelets may also be used to extract characteristics from a received image. In some embodiments, image characteristic extraction module 234 may partition the image into a plurality of channels and a plurality of portions, such that the channels determine a histogram of image intensities, determine characteristic vectors from intensity levels, and identify objects in a region of interest. Image characteristic extraction module 234 may perform other techniques to extract characteristics from received images.

Recognizer processor 230 may implement image characteristic extraction module 234 by executing software to create an environment for extracting image characteristics. However, in other embodiments image characteristic extraction module 234 may include independent hardware devices with specific architectures designed to improve the efficiency of aggregation or sorting processes. For example, image characteristic extraction module 234 may be a GPU array configured to partition and analyze layers in parallel. Alternatively or additionally, image characteristic extraction module 234 may be configured to implement a programming interface, such as Apache Spark™, and execute data structures, cluster managers, and/or distributed storage systems. For example, image characteristic extraction module 234 may include a resilient distributed dataset that is manipulated with a standalone software framework and/or a distributed file system.

Identification engine 236 may calculate correlations between a received image and stored attributes based on one or more identification models. For example, identification engine 236 may use a model from model generator 120 and apply inputs based on a received image or received image characteristics to generate an attributes list associated with the received image.

Identification engine 236 may be implemented by recognizer processor 230. For example, recognizer processor 230 may execute software to create an environment to execute models from model generator 120. However, in other embodiments identification engine 236 may include hardware devices configured to carry out parallel operations. Some hardware configurations may improve the efficiency of calculations, particularly when multiple calculations are being processed in parallel. For example, identification engine 236 may include multicore processors or computer clusters to divide tasks and quickly perform calculations. In some embodiments, identification engine 236 may receive a plurality of models from model generator 120. In such embodiments, identification engine 236 may include a scheduling module. The scheduling module may receive models and assign each model to independent processors or cores. In other embodiments, identification engine 236 may be FPGA Arrays to provide greater performance and determinism.

The components of image recognizer 110 may be implemented in hardware, software, or a combination of both, as will be apparent to those skilled in the art. For example, although one or more components of image recognizer 110 may be implemented as computer processing instructions embodied in computer software, all or a portion of the functionality of image recognizer 110 may be implemented in dedicated hardware. For instance, groups of GPUs and/or FPGAs maybe used to quickly analyze data in recognizer processor 230.

Figure 3:
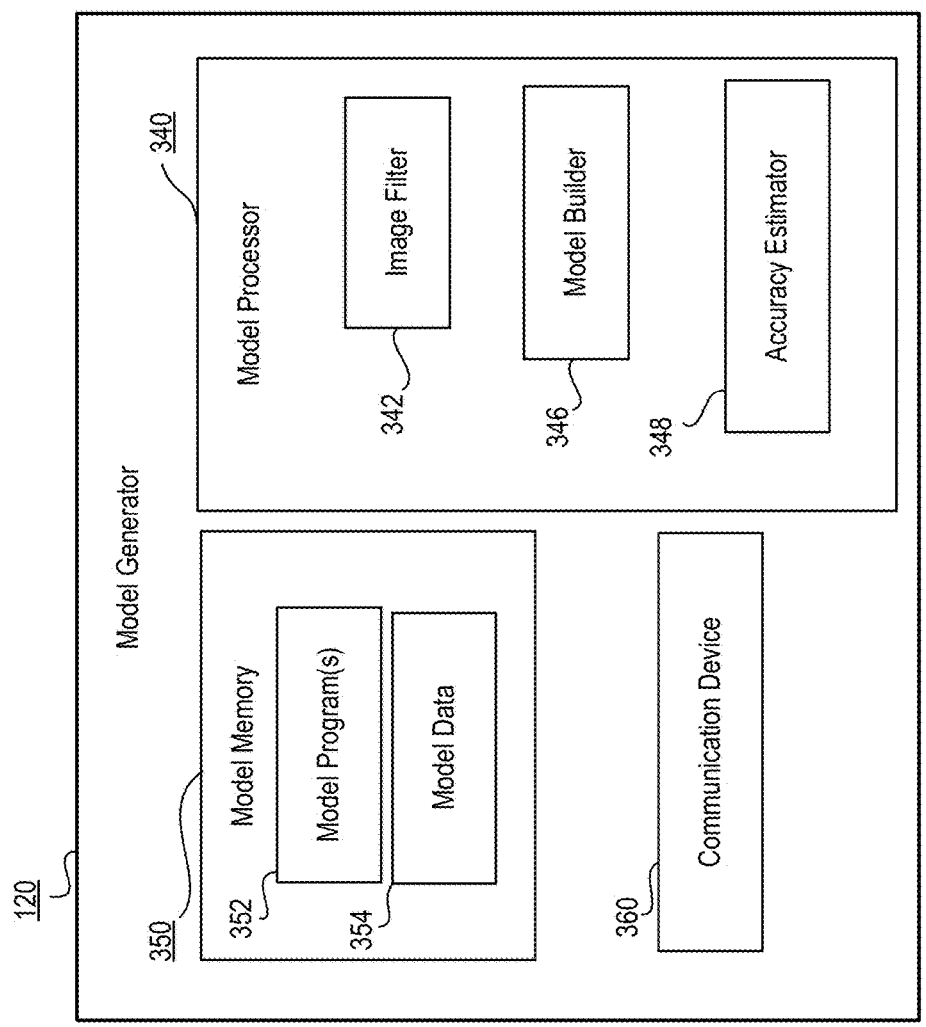
FIG. 3 is a block diagram of an exemplary model generator, consistent with disclosed embodiments.

Referring now to FIG. 3, there is shown a block diagram of an exemplary model generator, consistent with disclosed embodiments. Model generator 120 may include a model processor 340, a model memory 350, and a communication device 360.

Model processor 340 may be embodied as a processor similar to recognizer processor 230. Model processor may include an image filter 342, a model builder 346, and an accuracy estimator 348.

Image filter 342 may be implemented in software or hardware configured to generate additional images to enhance the training data set used by model builder 346. One challenge in implementing portable identification systems using convolutional neural networks is the lack of uniformity in the images received from mobile devices. To enhance accuracy and reduce error messages requesting the user to take and send new images, image filter 342 may generate additional images based on images already classified and labeled by image classifier 130. For example, image filter 342 may take an image and apply rotation, flipping, or shear filters to generate new images that can be used to train the convolutional neural network. These additional images may improve the accuracy of the identification model, particularly in augmented reality applications, in which the images may be tilted or flipped as the user of client devices 150 takes images. In other embodiments, additional images may be based on modifying brightness or contrast of the image. In yet other embodiments, additional images may be based on modifying saturation or color hues.

Model builder 346 may be implemented in software or hardware configured to create identification models based on training data. In some embodiments, model builder 346 may generate convolutional neural networks. For example, model builder 346 may take a group of labeled images from image classifier 130 to train a convolutional neural network.

In some embodiments, model builder 346 may generate nodes, synapsis between nodes, pooling layers, and activation functions, to create a vehicle identification model. Model builder 346 may calculate coefficients and hyper parameters of the convolutional neural networks based on the training data set. In such embodiments, model builder 346 may select and/or develop convolutional neural networks in a backpropagation with gradient descent. However, in other embodiments, model builder 346 may use Bayesian algorithms or clustering algorithms to generate identification models. In this context, a "clustering" is a computation operation of grouping a set of objects in such a way that objects in the same group (called a "cluster") are more similar to each other than to those in other groups/clusters. In yet other embodiments, model builder 346 may use association rule mining, random forest analysis, and/or deep learning algorithms to develop models. In some embodiments, to improve the efficiency of the model generation, model builder 346 may be implemented in one or more hardware devices, such as FPGAs, configured to generate models for vehicle image identification.

Accuracy estimator 348 may be implemented in software or hardware configured to evaluate the accuracy of a model. For example, accuracy estimator 348 may estimate the accuracy of a model, generated by model builder 346, by using a validation dataset. In some embodiments, the validation data set may be a portion of a training data set, that was not used to generate the identification model. Accuracy estimator 348 may generate error rates for the identification models, and may additionally assign weight coefficients to models based on the estimated accuracy.

Model memory 350 may include one or more storage devices configured to store instructions used by model processor 340 to perform operations related to disclosed embodiments. For example, model memory 350 may store software instructions, such as model program 352, that may perform operations when executed by model processor 340. In addition model memory 350 may include model data 354, which may include images to train a convolutional neural network.

In certain embodiments, Model memory 350 may store sets of instructions for carrying out processes to generate a model that identifies attributes of a vehicle.

Figure 4:
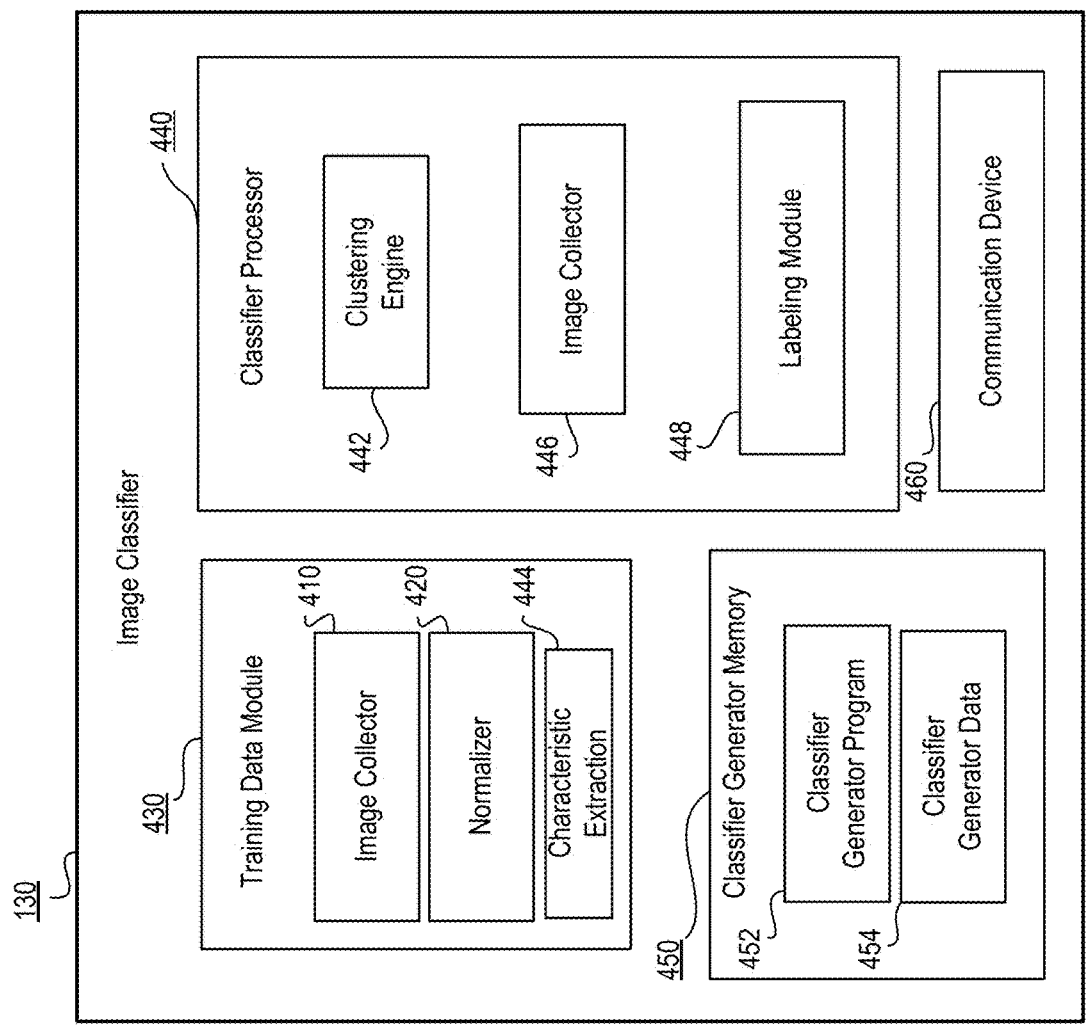
FIG. 4 is a block diagram of an exemplary image classifier, consistent with disclosed embodiments.

Referring now to FIG. 4, there is shown a block diagram of an exemplary image classifier 130, consistent with disclosed embodiments. Image classifier 130 may include a training data module 430, a classifier processor 440, and a classifier memory 450. In some embodiments, image classifier 130 may be configured to generate a group of images to be used as a training data set by model generator 120.

An issue that may prevent accurate image identification using machine learning algorithms is the lack of normalized or mislabeled images that can be used as a training data set. While billions of images are available online, selection of a group of images to develop an identification model is difficult. For example, because a very large quantity of images is required to generate accurate models, it is expensive and challenging to generate training data sets with standard computing methods. Also, although it is possible to input mislabeled images and let the machine learning algorithm identify outliers, this process may delay the development of the model and undermine its accuracy. Moreover, even when images may be identified, lack of information in the associated metadata may prevent the creation of validation data sets to test the accuracy of the identification model.

For example, it is necessary to collect multiple images of vehicles with a known make, year, and/or model to train the model to identify a vehicle in an image and recognize the vehicle's make, year, and/or model. While search engines can be used to identify images associated with vehicles, for example a general search for "Mercedes AND X63 AND 2018" would return many vehicle images, the search results may include multiple images that are irrelevant and which may undermine the identification model. For example, the resulting images may include images of the interior of a vehicle, which are irrelevant for a vehicle identification application. Moreover, such general searches may also include promotional images that are not associated with the vehicle. Therefore, it becomes necessary to select a group of the resulting images, before the model is trained, to improve accuracy and time to identification. Indeed, for portable and augmented reality application, in which time is crucial, curating the training data set to improve the identification efficiency improves the user experience.

Image classifier 130 may be configured to address these issues and facilitate the generation of groups of images for training convolutional networks. Image classifier 130 may include a data module 430 which includes an image collector 410, an image normalizer module 420, and a characteristic extraction module 444.

Image collector 410 may be configured to search for images associated with key words. In some embodiments, image collector 410 may collect images from online resources 140 and store them in classifier memory 450. In some embodiments, classifier memory 450 may include at least one million images of vehicles to provide sufficient accuracy for a clustering engine 442 of classifier processor 440 (to be described below) and/or a logistic regression classifier. For example, image collector 410 may be in communication with servers and/or websites of car dealers and copy images therefrom into memory 450 for processing. Additionally, in some embodiments image collector 410 may be configured to detect changes in websites of car dealers and, using a web scraper, collect images upon detection of such changes.

The collected images may have image metadata associated therewith. In some embodiments, image collector 410 may search the image metadata for items of interest, and classify images based on the image metadata. In some embodiments image collector 410 may perform a preliminary keyword search in the associated image metadata. For example, image collector 410 may search for the word "car" in image metadata and discard images whose associated metadata does not include the word "car." In such embodiments, image collector 410 may additionally search metadata for additional words or associated characteristics to assist in classifying the collected images. For instance, image collector may look for word "interior" or "exterior" in the image metadata. Alternatively, image collector 410 may identify images based on XMP data. In some embodiments, image collector 410 may classify images as "characteristicless" if the metadata associated with the images does not provide enough information to classify the image.

Training data module 430 may additionally include an image normalization module 420, similar to the image normalization module 232. However, in some embodiments, image normalization module 420 may have a different model image resulting in a different normalized image. For example, the model image in image normalization module 420 may have a different format or different size.

Training data module 430 may have a characteristic extraction module 444 configured to extract characteristics of images. In some embodiments, characteristic extraction module 444 may be similar to the image characteristic extraction module 234. For example, image characteristic extraction module 234 may also be configured to extract characteristics by using a convolutional neural network.

In other embodiments, images that are collected by image collector 410 and normalized by image normalization module 420 may be processed by characteristic extraction module 444. For example, characteristic extraction module 444 may use max pooling layers, and mean, max, and L2 norm layers to computer data about the images it receives. The characteristic extraction module 444 may additionally generate a file with the characteristics it identified from the image.

In yet other embodiments, characteristic extraction module 444 may implement characteristic extraction techniques as compiled functions that feed-forward data into an architecture to the layer of interest in the neural network. For instance, characteristic extraction module 444 may implement the following script:

dense_layer=layers.get_output(net1.layers_['dense'], deterministic=True)
    output_layer=layers.get_output(net1.layers_['output'], deterministic=True)
    input_var=net1.layers_['input'].input_var
    f_output=t.function([input_var], output_layer)
    f_dense=t.function([input_var], dense_layer)

The above functions may generate activations for a dense layer, layers before output layers. In some embodiments, characteristic extraction module 444 may use this activation to determine image parameters.

In other embodiments, characteristic extraction module 444 may implement engineered characteristic extraction methods such as scale-invariant characteristic transform, Vector of Locally Aggregated Descriptors (VLAD) encoding, or extractHOGCharacteristics, among others. Alternatively or additionally, characteristic extraction module 444 may use discriminative characteristics based in the given context (i.e. Sparse Coding, Auto Encoders, Restricted Boltzmann Machines, PCA, ICA, K-means).

Image classifier 130 may include a classifier processor 440 which may include clustering engine 442, regression calculator 446, and labeling module 448. In some embodiments, classifier processor 440 may cluster images based on the extracted characteristics using classifier processor 440 and particularly clustering engine 442.

In some embodiments, clustering engine 442 may perform a density-based spatial clustering of applications with noise (DBSCAN). In such embodiments, clustering engine 442 may find a distance between coordinates associated with the images to establish core points, find the connected components of core points on a neighbor graph, and assign each non-core point to a nearby cluster. In some embodiments, clustering engine 442 may be configured to only create two clusters in a binary generation process. Alternatively or additionally, the clustering engine 442 may eliminate images that are not clustered in one of the two clusters as outliers. In other embodiments, clustering engine 442 may use linear clustering techniques, such as reliability threshold clustering or logistic regressions, to cluster the coordinates associated with images. In yet other embodiments, clustering engine 442 may implement non-linear clustering algorithms such as MST-based clustering.

In some embodiments, clustering engine 442 may transmit information to labeling module 448. Labeling module 448 may be configured to add or modify metadata associated with images clustered by clustering engine 442. For example, labeling module 448 may add comments to the metadata specifying a binary classification. In some embodiments, where clustering engine 442 clusters vehicles exteriors and car interiors, the labeling module 448 may add a label of "exterior" or "interior" to the images in each cluster.

In some embodiments, a regression calculator 446 may generate a logistic regression classifier based on the images that have been labeled by labeling module 448. In some embodiments, regression calculator 446 may develop a sigmoid or logistic function that classifies images as "car interior" or "car exterior" based on the sample of labeled images. In such embodiments, regression calculator 446 may analyze the labeled images to determine one or more independent variables. Regression calculator 446 may then calculate an outcome, measured with a dichotomous variable (in which there are only two possible outcomes). Regression calculator 446 may then determine a classifier function that, given a set of image characteristics, may classify the image into one of two groups. For instance, regression calculator 446 may generate a function that receives an image of a vehicle and determines if the image is of a car interior or exterior.

Classifier memory 450 may include one or more storage devices configured to store instructions used by classifier processor 440 to perform functions related to disclosed embodiments. For example, classifier memory 450 may store software instructions, such as classifier program 452, that may perform one or more operations when executed by classifier processor 440. In addition classifier memory 450 may include model data 354, which may include images for the regression calculator 446.

In certain embodiments, model memory 350 (FIG. 3) may store sets of instructions for carrying out processes to generate a model that identifies attributes of a vehicle based on images from image classifier 130. For example, identification system 105 may execute processes stored in model memory 350 using information from image classifier 130 and/or data from training data module 430.

Figure 5:
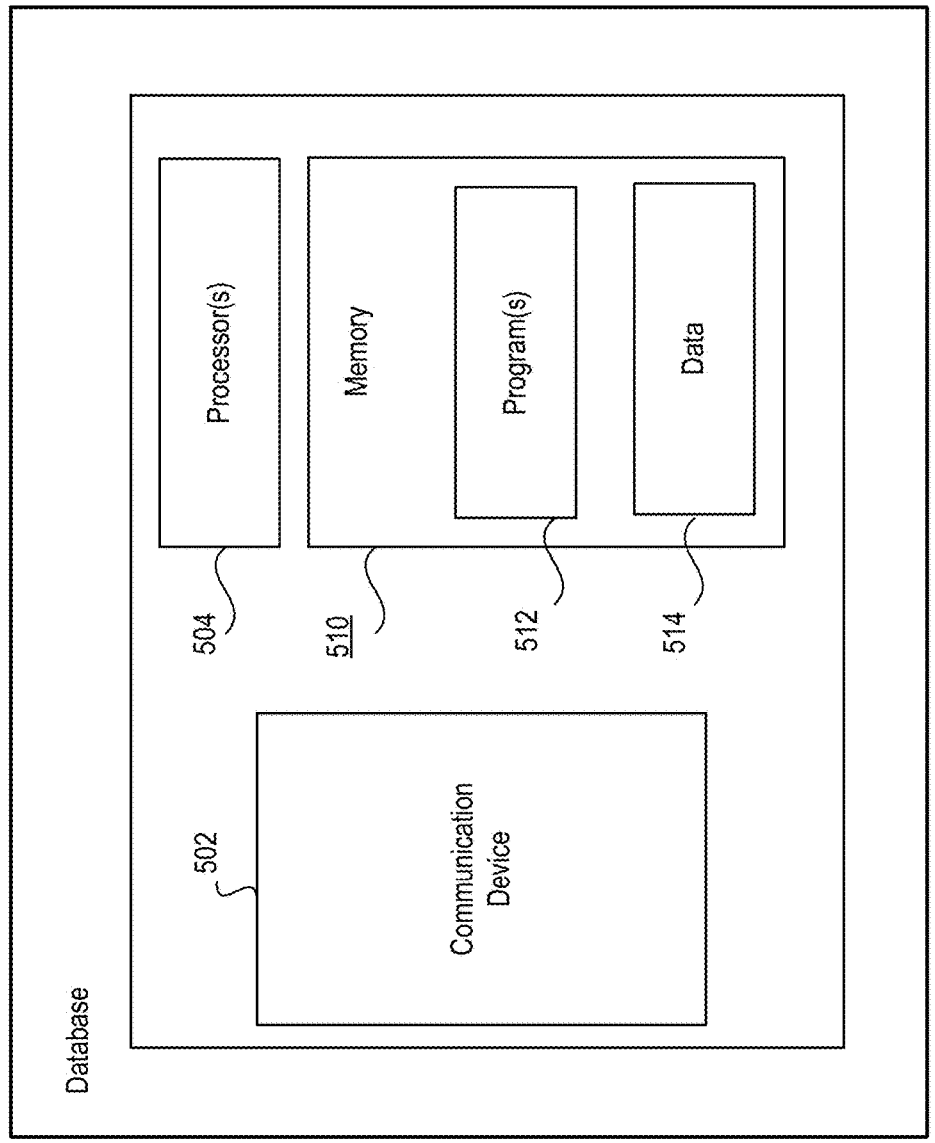
FIG. 5 is a block diagram of an exemplary database, consistent with disclosed embodiments.

Referring now to FIG. 5, there is shown a block diagram of an exemplary database 180 (FIG. 1), consistent with disclosed embodiments. Database 180 may include a communication device 502, one or more database processors 504, and database memory 510 including one or more database programs 512 and data 514.

In some embodiments, databases 180 may take the form of servers, general purpose computers, mainframe computers, or any combination of these components. Other implementations consistent with disclosed embodiments are possible as well.

Communication device 502 may be configured to communicate with one or more components of system 100, such as online resource 140, identification system 105, model generator 120, image classifier 130, and/or client devices 150. In particular, communication device 502 may be configured to provide to model generator 120 and image classifier 130 images of vehicles that may be used to generate a CNN or an identification model.

Communication device 502 may be configured to communicate with other components as well, including, for example, model memory 352 (FIG. 3). Communication device 502 may take any of the forms described above for communication device 210 (FIG. 2).

Database processors 504, database memory 510, database programs 512, and data 514 may take any of the forms described above for recognizer processors 230, memory 220, recognizer programs 222, and recognizer data 224, respectively, in connection with FIG. 2. The components of databases 180 may be implemented in hardware, software, or a combination of both hardware and software, as will be apparent to those skilled in the art. For example, although one or more components of databases 180 may be implemented as computer processing instruction modules, all or a portion of the functionality of databases 180 may be implemented instead in dedicated electronics hardware.

Data 514 may be data associated with websites, such as online resources 140. Data 514 may include, for example, information relating to websites of car dealers and/or car manufacturers. Data 514 may include images of cars and information relating to cars, such as cost, condition, and dealers offering the car for sale.

Figure 6:
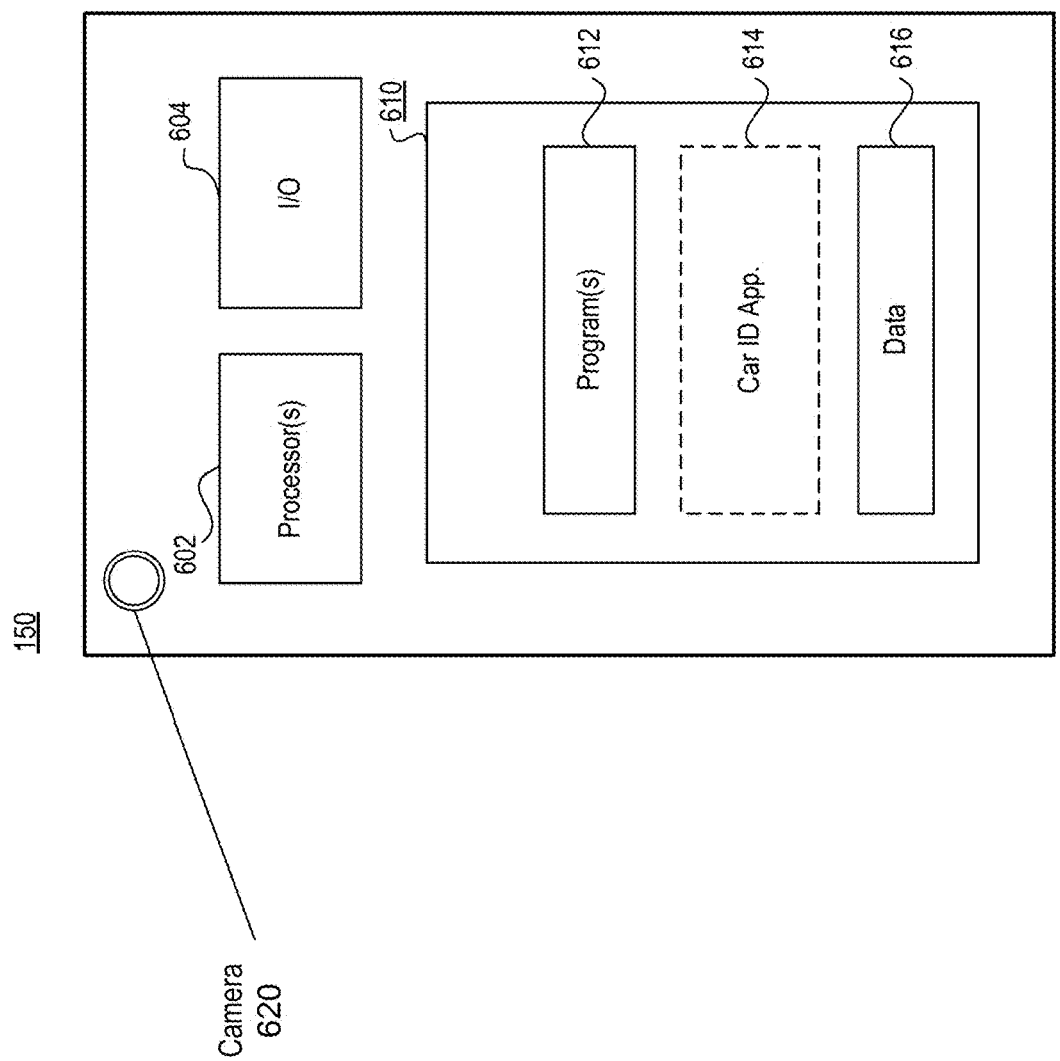
FIG. 6 is a block diagram of an exemplary client device, consistent with disclosed embodiments.

Referring now to FIG. 6, there is shown a block diagram of an exemplary client device 150 (FIG. 1), consistent with disclosed embodiments. In one embodiment, client devices 150 may include one or more processors 602, one or more input/output (I/O) devices 604, and one or more memories 610. In some embodiments, client devices 150 may take the form of mobile computing devices such as smartphones or tablets, general purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may comprise web browsers or similar computing devices that access web site consistent with disclosed embodiments.

Processor 602 may include one or more known processing devices, such as mobile device microprocessors manufactured by Intel™, NVIDIA™, or various processors from other manufacturers. The disclosed embodiments are not limited to any specific type of processor configured in client devices 150.

Memory 610 may include one or more storage devices configured to store instructions used by processor 602 to perform functions related to disclosed embodiments. For example, memory 610 may be configured with one or more software instructions, such as programs 612 that may perform operations when executed by processor 602. The disclosed embodiments are not limited to separate programs or computers configured to perform dedicated tasks. For example, memory 610 may include a single program 612 that performs the functions of the client devices 150, or program 612 may comprise multiple programs. Memory 610 may also store data 616 that is used by one or more programs 312 (FIG. 3).

In certain embodiments, memory 610 may store a vehicle identification application 614 that may be executed by processor(s) 602 to perform one or more identification processes consistent with disclosed embodiments. In certain aspects, vehicle identification application 614, or another software component, may be configured to request identification from identification system 105 or determine the location of client devices 150. For instance, these software instructions, when executed by processor(s) 602 may process information to generate a request for hours of operation.

I/O devices 604 may include one or more devices configured to allow data to be received and/or transmitted by client devices 150 and to allow client devices 150 to communicate with other machines and devices, such as other components of system 100. For example, I/O devices 604 may include a screen for displaying optical payment methods such as Quick Response Codes (QR), or providing information to the user. I/O devices 604 may also include components for NFC communication. I/O devices 504 may also include one or more digital and/or analog devices that allow a user to interact with client devices 150 such as a touch-sensitive area, buttons, or microphones. I/O devices 604 may also include one or more accelerometers to detect the orientation and inertia of client devices 150. I/O devices 604 may also include other components known in the art for interacting with identification system 105.

In some embodiments, client devices 150 may include a camera 620 that is configured to capture images or video and send it to other components of system 100 via, for example, network 170.

The components of client devices 150 may be implemented in hardware, software, or a combination of both hardware and software, as will be apparent to those skilled in the art.

Figure 7:
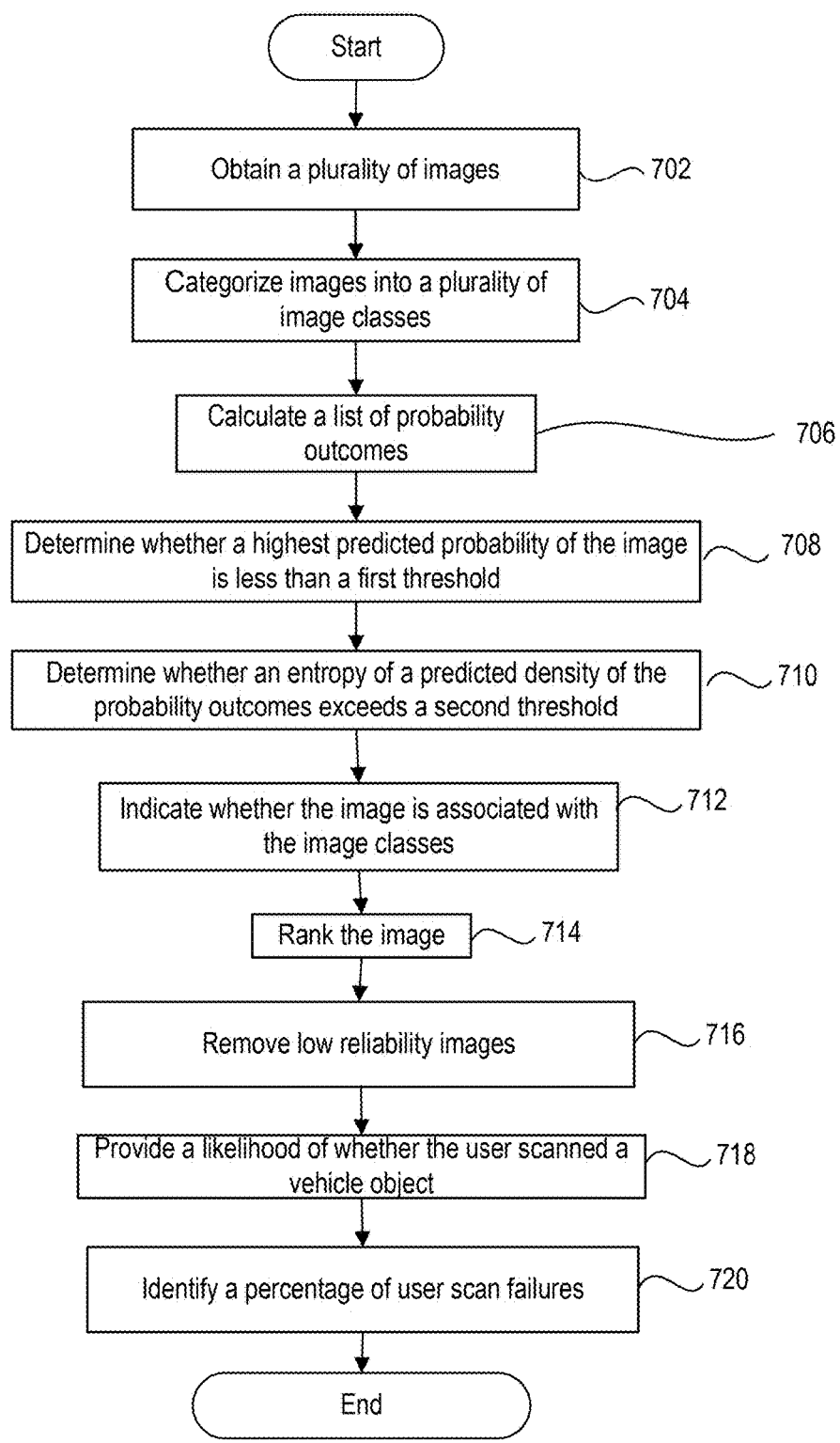
FIG. 7 is an exemplary flow chart illustrating a first inspection process, consistent with disclosed embodiments.

Referring now to FIG. 7, there is shown a flow chart of an exemplary first inspection process 700, consistent with disclosed embodiments. In some embodiments, first inspection process 700 may be executed by identification system 105 (which may include image recognizer 110, model generator 120, and image classifier 130).

In step 702, identification system 105 (FIG. 1) may receive a plurality of images. The images may include associated image metadata, and the metadata may include an indication that the images represent an appearance of a vehicle and an indication that the images identify a vehicle make, model, or trim. The metadata may also include an indication that the images neither represent a vehicle nor identify a vehicle make, model, or trim (as exemplified by the covered vehicles shown in FIG. 10). The metadata may further indicate a storage location in memory based on vehicle and/or image characteristics, and the images may be categorized for storage as discussed below.

At step 704, identification system 105 may categorize the images into a plurality of image classes, the image classes being associated with an image characteristic. For example, the images may include vehicle images, and the image classes may be associated with both vehicle exteriors and vehicle interiors. Additionally, the image characteristic may include at least one of a vehicle make, a vehicle model, a vehicle year, or a vehicle trim. The image classes may also be clustered by a vehicle class and a non-vehicle class, and the vehicle class may be partitioned between image classes where vehicle characteristics are known and image classes where vehicle characteristics are not known.

Figure 12A:
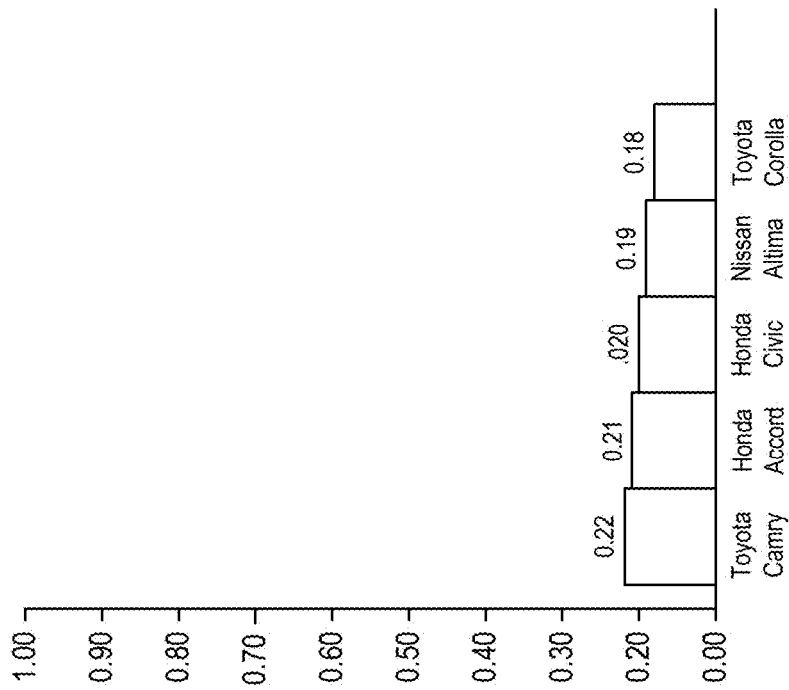
FIGS. 12A-12B are exemplary plots illustrating probability outcome distributions in accordance with disclosed embodiments.

At step 706, identification system 105 may calculate a plurality of probability outcomes, the probability outcomes being associated with the image classes. Identification system 105 may provide a make and model combination list including at least five or more probability outcomes being associated with different vehicle make and model combinations. As an example, identification system 105 may calculate the following probability outcomes for a captured first image: Toyota Camry: 0.80, Honda Accord: 0.10, Honda Civic: 0.04, Nissan Altima: 0.03, and Toyota Corolla: 0.03. The five probability outcomes (as shown in FIG. 12A) may sum to a value of 1.0, and may indicate that there is an 80% chance that the image contains a Toyota Camry. Accordingly, identification system 105 may indicate there is an 80% likelihood that the vehicle in the image should be associated with a Toyota Camry image class.

At step 708, identification system 105 may determine, based on the calculated probability outcomes whether highest predicted probabilities of the images are less than a first threshold. Identification system 105 may determine whether the highest predicted probability of the images are below a threshold value, or constitute a low value. In the foregoing example, since the highest predicted probability of an image is 0.80 (or 80%), the image most likely contains a Toyota Camry, and the probability may exceed a threshold value.

Figure 12B:
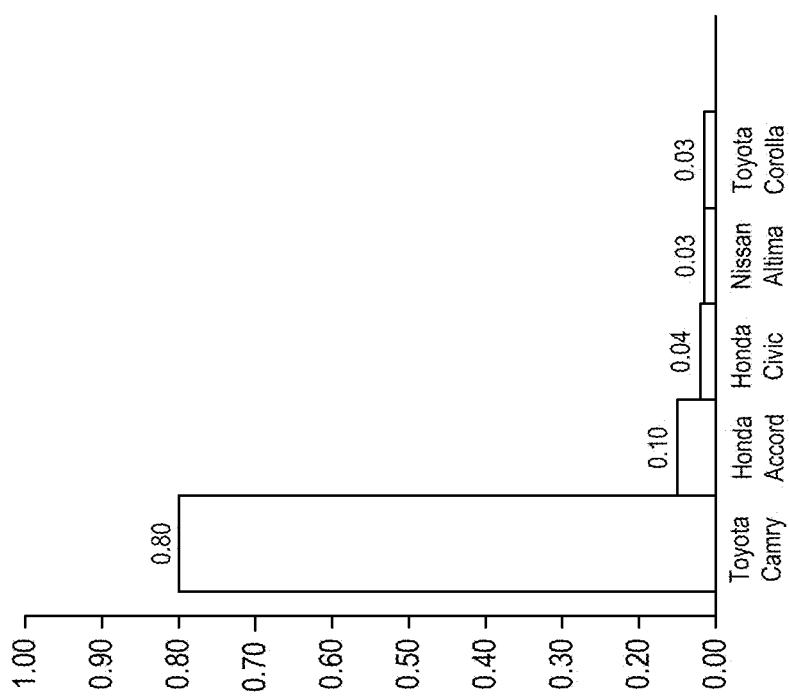

At step 710, identification system 105 may determine whether an entropy of a predicted density of the probability outcomes exceeds a second threshold. The high entropy of the predicted density may indicate that the image is not a vehicle exterior image. As an example, identification system 105 may calculate the following probability outcomes for a captured second image: Toyota Camry: 0.22, Honda Accord: 0.21, Honda Civic: 0.20, Nissan Altima: 0.19, and Toyota Corolla: 0.18. The similarity and low values of the five probability outcomes (as shown in FIG. 12B) indicate that it is highly unlikely that the image is a vehicle. Not only is no single probability high, but the entropy of the predicted density is high. In other words, since identification system 105 could not find any large difference of probability outcomes among the predicted classes, it is likely that the image is fundamentally different than all of these classes, and therefore, is not one of the foregoing vehicle make or models.

At step 712, identification system 105 may indicate whether the image is associated with the image classes, the association being determined by at least the probability outcomes which indicate the reliability or the likelihood of an image being inaccurate of an image. Identification system 105 may partition images in the image classes into further image classes including training images and validation images to further train identification system 105. Where the captured image includes a high likelihood of a vehicle (e.g. Toyota Camry), this image may be included amongst the training and validation images.

At step 714, identification system 105 may rank the image amongst the plurality of images, the ordering of the ranking being reflective of a reliability or the likelihood of an image being inaccurate of the image. Identification system 105 may detect a reliability or the likelihood of an image being inaccurate of an image based on the predicted density of a multi-class prediction model. For instance, in the foregoing example, the first captured image may be ranked higher than the second captured image based on a comparison of the predicted density probability outcomes, and the second captured image may subsequently be filtered and/or deleted by identification system 105 as discussed below.

At step 716, identification system 105 may filter, based on the ranking, a plurality of low reliability (or a high likelihood of an image being inaccurate) images according to a third threshold, the filtering including removing at least one of the low reliability images. The filtering may include automatically deleting at least one of the low reliability images. As an example, identification system 105 may filter out 40,000 or more inaccurate images (that do not include an actual vehicle) among over 1 million images.

At step 718, identification system 105 may provide, based on the image classes, a likelihood of whether the user scanned a vehicle object associated with the image. At step 720, identification system 105 may identify a percentage of user scan failures due to user misuse of a client device 150 in accordance with whether or not the user is scanning a vehicle image. Other computations and/or determinations may be made in accordance with image analysis and the disclosed embodiments.

Figure 8:
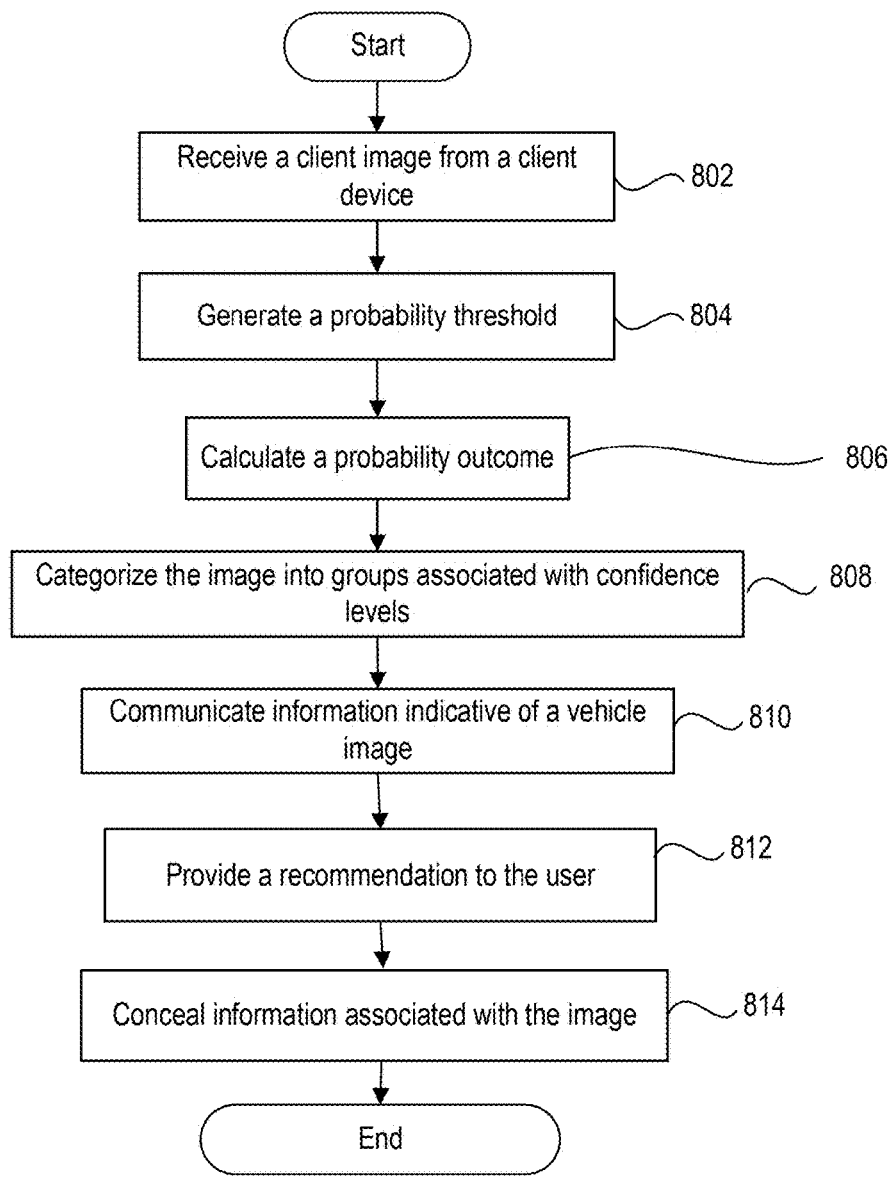
FIG. 8 is an exemplary flow chart illustrating a second inspection process, consistent with disclosed embodiments.

Referring now to FIG. 8, there is shown a flow chart of another exemplary inspection process 800, consistent with disclosed embodiments. In some embodiments, second inspection process 800 may be executed by identification system 105.

At step 802, identification system 105 may receive a client image from the client device 150 operated by a user. Client device 150 may be a mobile device that stores and executes mobile applications to perform operations that provide functions offered by identification system 105 and/or online resources 140, such as providing information about vehicles in a database 180. Client devices 150 may have camera 620 to capture video and/or client images that include a vehicle or related vehicle indicia.

At step 804, identification system 105 may generate a probability threshold that defines a likelihood that the received client image includes a vehicle. Identification system 105 may automatically generate the probability threshold to delineate between high and low probability values. For example, a high probability threshold may be greater than 0.50 or 50%. Conversely, a low probability threshold may be less than 0.50 or 50%. Other probability thresholds may be contemplated. Where a probability outcome for the received client image exceeds 0.50, there is a high likelihood that the image contains a vehicle.

At step 806, identification system 105 may calculate, using a prediction function, a probability indicative of the likelihood that the received client image includes a vehicle. Identification system 105 may determine, based on the comparison of the calculated probability to the probability threshold, whether the image includes a vehicle or does not include a vehicle. Identification system 105 may perform one or more of steps 706-712 as shown in FIG. 7 and discussed above to determine whether the image contains an actual vehicle or not.

At step 808, identification system 105 may categorize the image into at least one of a first group, a second group, or a third group, the groups representing first, second, and third confidence levels. The first, second, and third confidence levels may be calculated for categorizing the received client image into the first, second, and third groups. The confidence levels may indicate a likelihood that the image should be classified in accordance with a particular group. For example, where the first image group includes only vehicles where a vehicle make and model is ascertainable from analysis of the image, a 95% confidence level may be sufficient for the image to be categorized into the first group. Identification system 105 may then rank, based on group categorization, an image amongst a plurality of previously stored images. The ranking may indicate the likelihood the image contains a vehicle versus the likelihood the image does not contain a vehicle. Identification system 105 may also generate fourth and fifth groups for categorizing training images and validation images. The training and validation images may be used to train and validate the identification system 105 for future performance and vehicle image detection.

At step 810, identification system 105 may communicate, when the image is categorized in the first group, first information that indicates the image includes a vehicle, and when the image is categorized in the second group, second information that the image does not include a vehicle. The first information may include a textual or visual message displayed on a graphical user interface of the client device 150 and may alert the user that the image includes a vehicle. The second information may include a textual or visual message displayed on a graphical user interface of the client device and may alert the user that the image does not include a vehicle.

At step 812, identification system 105 may provide, when the image is categorized in the second group, a recommendation to the user not to capture the same image. Identification system 105 may also delete, when the image is categorized in the second group, the image. Identification system 105 may further communicate to the user a recommendation to capture and transmit a new image.

At step 814, identification system 105 may conceal, when the image is categorized in the third group, third information associated with the image. The third information may include the make, the model, or the trim of the vehicle. Identification system 105 may also provide, when the image is categorized in the third group, a recommendation to the user to capture a new image of the same vehicle. Identification system 105 may conceal the vehicle make or model because it is unable to verify with certainty that the vehicle model or make is accurate. Therefore, in order to verify the proper vehicle make or model, identification system 105 may recommend to the user to capture a new image of the same vehicle so as to determine the make or model of the vehicle.

Figure 9:
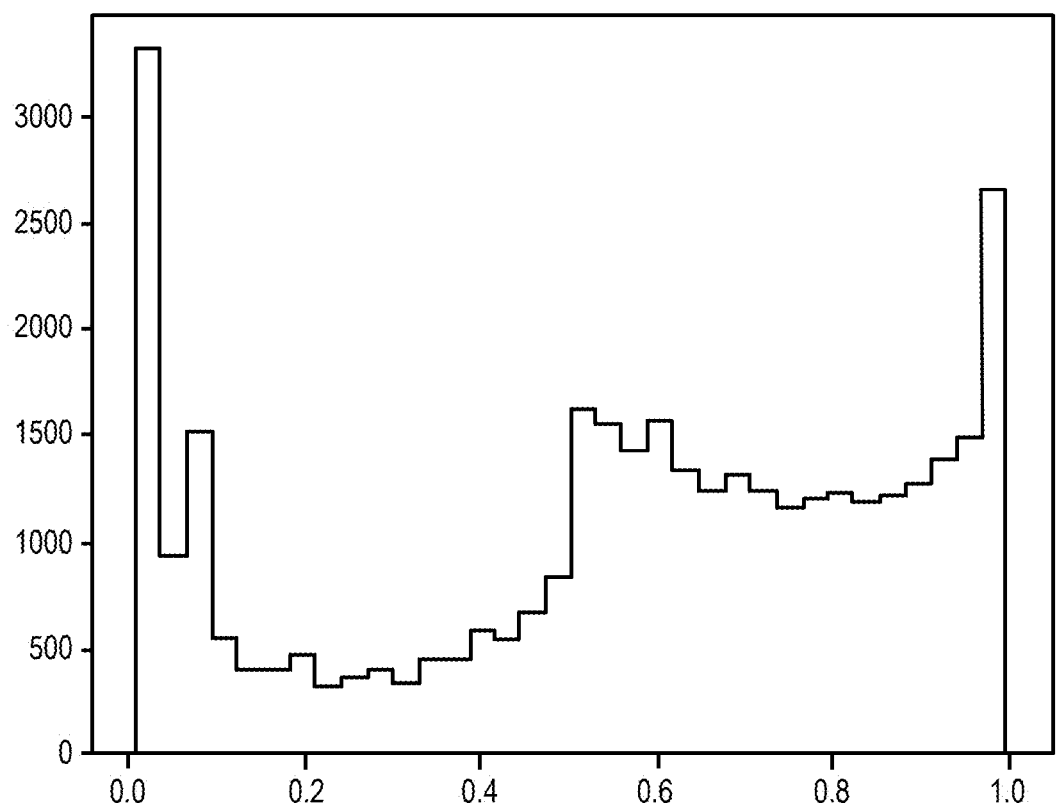
FIG. 9 is an exemplary plot illustrating the distribution of a highest probability score from 10000s of labeled training images with incorrect predictions in accordance with disclosed embodiments.

FIG. 9 is an exemplary plot illustrating the distribution of a highest probability score from 100000s of labeled training images with incorrect predictions in accordance with disclosed embodiments. FIG. 9 illustrates that there exists a large subset of training images where a top prediction probability score is low (namely below a threshold value of 0.05), and where these images are likely to constitute mislabeled images. In FIG. 9, the highest probability for an incorrect prediction occurs at both very high and very low probability predictions (as shown). Accordingly, where identification system 105 yields probabilities near 0.01 and 1.0 for nearly 3,000 images that indicate a predicted vehicle image, the likelihood of the image being a vehicle is very low (e.g. the prediction is likely incorrect and not reliable). As a further example, in FIG. 9, identification system 105 may be trained in order to provide a threshold cut-off point for displaying a message about the content relevance to the user.

Figure 10A:
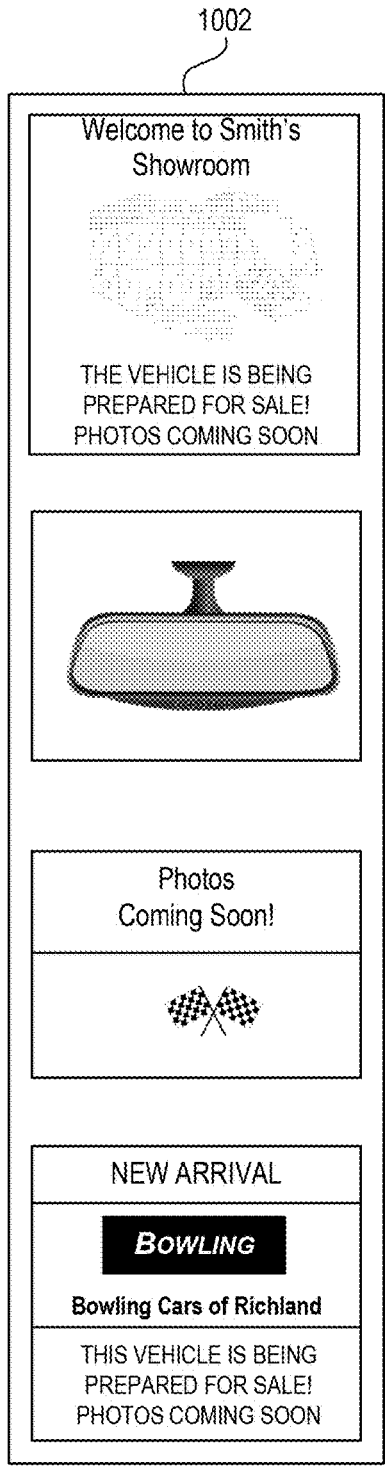
FIGS. 10A, 10B, and 10C are exemplary illustrations of captured images displaying vehicle information in accordance with disclosed embodiments.
Figure 10B:
Figure 10C:
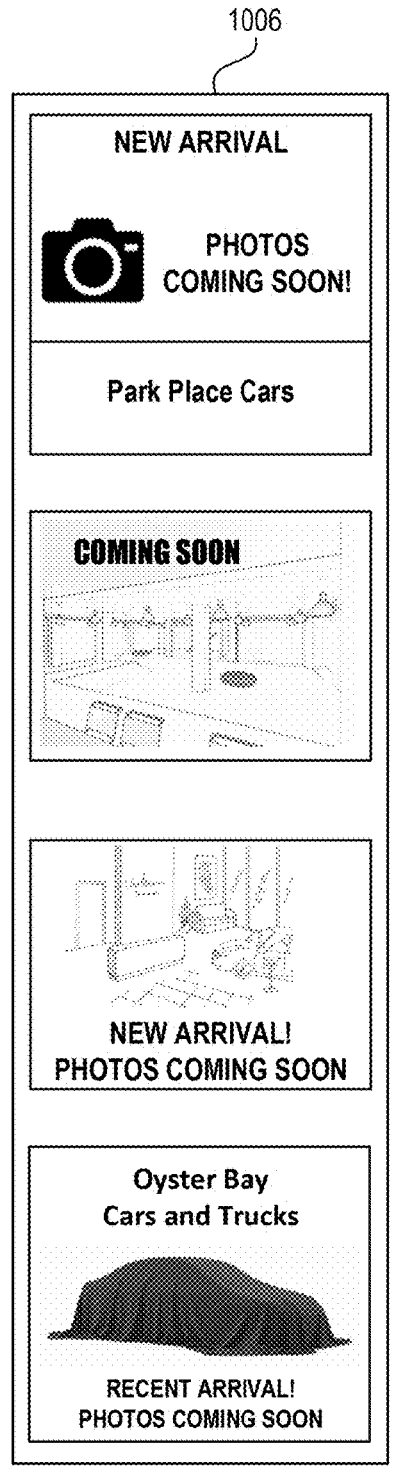

FIGS. 10A-10C are exemplary illustrations of captured images showing displays of vehicle information, in accordance with disclosed embodiments. For example, in FIG. 10A, a first image grouping 1002 includes images of a vehicle dealership building, a rearview mirror, a vehicle dealership logo, and a vehicle advertisement. In FIGS. 10B-10C, second image grouping 1004 and third image grouping 1006 include new arrival images and dealership advertisements. In particular, FIG. 10A includes "Smith's Showroom," "South Town Cars," and "Bowling Cars of Richland." FIGS. 10B-10C include "Passage Luxury Vehicles," "Cowboy Cars," and "Oyster Bay Car and Trucks." As shown in FIGS. 10A-10C, other captured images include covered vehicles so as to conceal the vehicle make and model.

As shown in FIGS. 10A-10C, these images include vehicle advertisements and related vehicle indicia that do not accurately constitute an actual vehicle, thereby limiting the ability of Identification system 105 to accurately and precisely train its model for detection of actual vehicles (and vehicle exteriors) in images. Therefore, consistent with the disclosure, identification system 105 may group these images into a class affiliated with non-vehicles and may rank these images as low reliability (or high likelihood of an image being inaccurate) images amongst higher reliability images that actually include actual vehicles. Identification system 105 may then delete or remove these low reliability images from storage, and may not rely on these images or metadata for training or detecting of subsequent vehicles in images.

Identification system 105 may include at least two other image classes, one of which being associated with a reliable determination of a vehicle, but where identification system 105 is unable to determine vehicle characteristics. The covered vehicles in the images as shown in FIG. 10 may fit into this category since vehicle characteristics are concealed. These images may not be shown to a user operating a client device 150. The other image class may include a high probability of an image including a vehicle whereby vehicle characteristics are easily detectable and visible in an image. In contrast, these images may be shown to the user operating a client device 150. Textual information and other information may also be presented with the images to the user operating the client device 150 in accordance with the foregoing classification schemes.

Figure 11A:
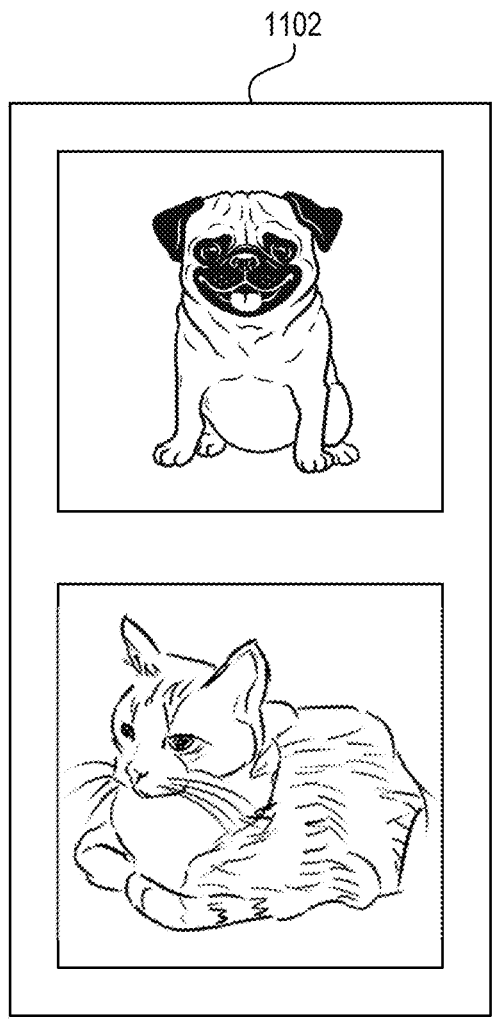
FIGS. 11A-11B are exemplary illustrations of captured images displaying non-vehicle information in accordance with disclosed embodiments.
Figure 11B:
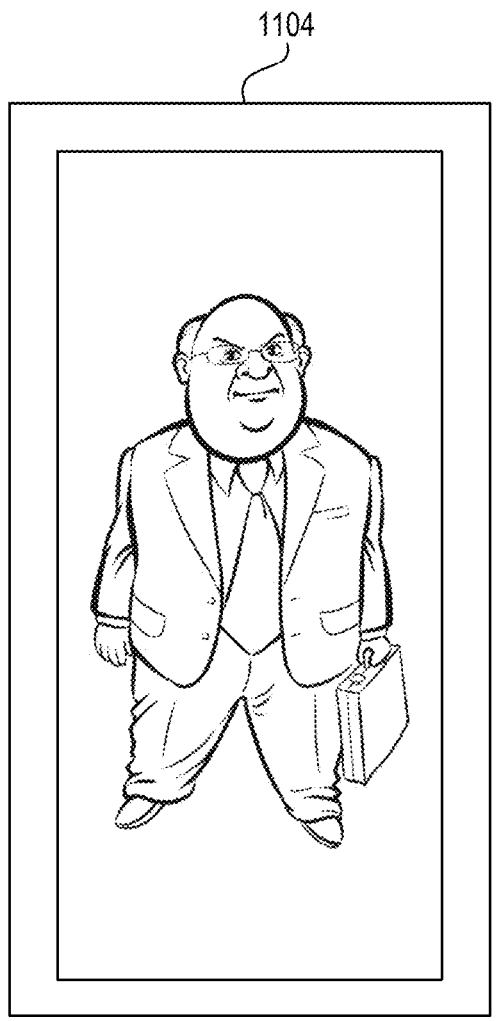

FIGS. 11A-11B are exemplary illustrations of captured images displaying non-vehicle information in accordance with disclosed embodiments. For example, as shown in FIG. 11A, a first image grouping 1102 include images of a dog and a cat, and in FIG. 11B, a second image 1104 includes an image of a person. First image grouping 1102 and second image 1104 do not include a vehicle, thereby limiting the ability of Identification system 105 to accurately and precisely train its model for detection of actual vehicles (and vehicle exteriors) in images. Therefore, consistent with the disclosure, identification system 105 may group these images into a class affiliated with non-vehicles (separate from non-vehicle images that include vehicle related information as shown in FIGS. 10A-10C) and may rank these images as low reliability (highly inaccurate) images amongst higher reliability images that actually include actual vehicles. Identification system 105 may then delete or remove these low reliability images from storage, and may not rely on these images or metadata for training or detecting of subsequent vehicles in images.

FIGS. 12A-12B are exemplary plots illustrating probability outcome distributions in accordance with disclosed embodiments. As shown in FIG. 12A, identification system 105 may yield the following probability outcomes for a captured first image: Toyota Camry: 0.80, Honda Accord: 0.10, Honda Civic: 0.04, Nissan Altima: 0.03, and Toyota Corolla: 0.03. The five probability outcomes may sum to a value of 1.0, and may indicate that there is an 80% chance that the image contains a Toyota Camry. Accordingly, identification system 105 may indicate there is an 80% likelihood that the vehicle in the image should be associated with a Toyota Camry image class.

As shown in FIG. 12B, identification system 105 may yield the following probability outcomes for a captured second image: Toyota Camry: 0.22, Honda Accord: 0.21, Honda Civic: 0.20, Nissan Altima: 0.19, and Toyota Corolla: 0.18. The similarity and low values of the five probability outcomes indicate that it is highly unlikely that the image is a vehicle. Not only is no single probability high, but the entropy of the predicted density is high. In other words, since identification system 105 could not find any large difference of probability outcomes among the predicted classes, it is likely that the image is fundamentally different than all of these classes, and therefore, is not one of the foregoing vehicle make or models. Identification system 105 is not limited to the probability results as shown in FIGS. 12A-12B, and may yield any probability outcomes in accordance with received images.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A system for inspecting a reliability of an image, comprising:
    at least one processor in communication with a client device; and
    at least one storage medium storing instructions that, when executed, configure the at least one processor to perform operations comprising:
        receiving, from the client device and based on an image captured by the client device, a plurality of probability outcomes associated with respective image classes of a plurality of image classes, the probability outcomes being determined using an object recognition model on the client device, the image classes being associated with an image characteristic comprising at least one of a vehicle make, a vehicle model, a vehicle year, or a vehicle trim;
        determining that the probability outcomes do not indicate that the image is associated with one of the respective image classes by:
            determining a first entropy of a distribution of the probability outcomes;
            comparing the first entropy to a threshold based on a second entropy of a predicted density, the predicted density being based on a plurality of vehicle images and respective pluralities of probability outcomes; and
            determining the first entropy to not satisfy the threshold; and
        providing an indication to a user that a vehicle object was not identified in the image;
        wherein the system or client device determines, based on a likelihood of the image being associated with at least one of the image classes, whether to include the image within at least one of a group of validation images or a group of training images.

2. The system of claim 1, the operations further comprising determining a percentage of user scan failures due to user misuse based in part on the determination that the probability outcomes do not indicate that the image is associated with one of the respective image classes.

3. The system of claim 1, wherein receiving the probability outcomes comprises receiving a plurality of probability outcomes based on metadata associated with the image.

4. The system of claim 3, wherein the metadata comprises at least one of:
    an indication that the image represents an appearance of a vehicle; or
    an indication that the image identifies at least one of a vehicle make, a vehicle model, or a vehicle trim.

5. The system of claim 1, wherein the image classes are further associated with one of a vehicle exterior or a vehicle interior.

6. The system of claim 1, the operations further comprising categorizing the image into one of a first group representing a first confidence level, a second group representing a second confidence level, or a third group representing a third confidence level.

7. The system of claim 6, the operations further comprising ranking the image among stored images based on the categorization of the image.

8. The system of claim 7, wherein the ranking of the image indicates a likelihood that the image does not contain a vehicle.

9. The system of claim 1, wherein the system is configured to:
    estimate, using the group of validation images, an accuracy of the object recognition model on the client device or another object recognition model; or
    train, using the group of training images, the object recognition model on the client device or another object recognition model.

10. The system of claim 1, the operations further comprising deleting the image based on the determination that the probability outcomes do not indicate that the image is associated with one of the respective image classes.

11. The system of claim 10, wherein providing an indication comprises providing an indication prompting the user to transmit a new image.

12. The system of claim 1, wherein at least one of the image classes is associated with a reliable determination of a vehicle.

13. The system of claim 1, wherein the image classes are clustered into a vehicle class and a non-vehicle class.

14. The system of claim 13, wherein the vehicle class is partitioned into a class associated with known vehicle characteristics and a class not associated with known vehicle characteristics.

15. A computer-implemented method for inspecting a reliability of an image captured by a client device, the method comprising:
    receiving, from the client device and based on the image, a plurality of probability outcomes associated with respective image classes of a plurality of image classes, the probability outcomes being determined using an object recognition model on the client device, the image classes being associated with an image characteristic comprising at least one of a vehicle make, a vehicle model, a vehicle year, or a vehicle trim;
    determining that the probability outcomes do not indicate that the image is associated with one of the respective image classes by:
        determining a first entropy of a distribution of the probability outcomes;
        comparing the first entropy to a threshold based on a second entropy of a predicted density, the predicted density being based on a plurality of vehicle images and respective pluralities of probability outcomes; and
        determining the first entropy to not satisfy the threshold; and
    providing an indication to a user that a vehicle object was not identified in the image;
    wherein the client device or a separate system determines, based on a likelihood of the image being associated with at least one of the image classes, whether to include the image within at least one of a group of validation images or a group of training images.

16. The computer-implemented method of claim 15, further comprising determining a percentage of user scan failures due to user misuse based at least in part on the determination that the probability outcomes do not indicate that the image is associated with one of the respective image classes.

17. The computer-implemented method of claim 15, further comprising categorizing the image into a least one of a first group representing a first confidence level, a second group representing a second confidence level, or a third group representing a third confidence level.

18. The computer-implemented method of claim 17, further comprising ranking the image among stored images based on the categorization of the image.

19. The computer-implemented method of claim 18, wherein the ranking of the image indicates a likelihood that the image does not contain a vehicle.

20. The computer-implemented method of claim 15, wherein the indication prompts the user to capture and transmit a new image.

* * * * *